(12) United States Patent
Boerner

(10) Patent No.: US 8,500,500 B2
(45) Date of Patent: Aug. 6, 2013

(54) SWASH PLATE MECHANISM COMPRISING A SPUR TOOTHING

(75) Inventor: Joerg Boerner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 78 days.

(21) Appl. No.: 12/988,484

(22) PCT Filed: Apr. 27, 2009

(86) PCT No.: PCT/EP2009/055016
§ 371 (c)(1),
(2), (4) Date: Nov. 19, 2010

(87) PCT Pub. No.: WO2009/133044
PCT Pub. Date: Nov. 5, 2009

(65) Prior Publication Data
US 2011/0151731 A1    Jun. 23, 2011

(30) Foreign Application Priority Data
Apr. 30, 2008  (DE) .......................... 10 2008 001 491

(51) Int. Cl.
*B63H 5/125*   (2006.01)
(52) U.S. Cl.
USPC ................................................ 440/6; 440/58
(58) Field of Classification Search
USPC ....................................................... 440/6, 58
See application file for complete search history.

(56) References Cited

U.S. PATENT DOCUMENTS 3,881,365 A * 5/1975 Hardy ............................ 74/462
5,946,975 A * 9/1999 Yun ................................ 74/462
6,783,409 B2 * 8/2004 Lonngren ........................ 440/6
7,552,664 B2 * 6/2009 Bulatowicz ..................... 74/640

FOREIGN PATENT DOCUMENTS

| DE | 1 707 499 U | 9/1955 |
| DE | 27 31 486 A1 | 1/1979 |
| DE | 199 53 485 C1 | 5/2001 |
| EP | 0 078 111 B1 | 7/1987 |
| EP | 0 332 450 A2 | 9/1989 |
| EP | 1 450 070 A2 | 8/2004 |
| WO | 01/31760 A2 | 5/2001 |

OTHER PUBLICATIONS

International Search Report issued in international application No. PCT/EP2009/055016, mailed Sep. 7, 2009 (2 pages).
International Written Opinion issued in international application No. PCT/EP2009/055016, mailed Sep. 7, 2009 (5 pages).
International Preliminary Report on Patentability issued in international application No. PCT/EP2009/055016, dated Apr. 22, 2010 (7 pages).

* cited by examiner

*Primary Examiner* — Stephen Avila
(74) *Attorney, Agent, or Firm* — Brinks Hofer Gilson & Lione

(57) ABSTRACT

A swash plate mechanism consists of a drive element that can be rotated about a main axis, a transmission element that can be rotated about a swash plate axis, the swash plate axis intersecting the main axis at a swash plate angle and rotating about the main axis together with the drive element, a power take-off element and a supporting element. A first coupler is arranged between the transmission element and the power take-off element and a second coupler is arranged between the transmission element and the supporting element, with at least one of the two couplers being a pair of teeth, and with the teeth of the pairs of teeth serving as coupling means being designed as spur toothing.

12 Claims, 8 Drawing Sheets

Prior Art

SWASH PLATE MECHANISM COMPRISING A SPUR TOOTHING

This application is a filing under 35 U.S.C. §371 of International Patent Application PCT/EP2009/055016, filed Apr. 27, 2009, which claims priority to German Application No. 10 2008 001 491.5, filed Apr. 30, 2008, each of which is hereby incorporated by reference herein in its entirety.

The present invention concerns a harmonic drive according to the preamble of claim 1.

The principle of the harmonic drive is known and allows for very high transmission ratios with only a few transmission stages, using only a small number of components. The principle of the harmonic drive is applied especially in the context of reducing high drive speeds to very low drive speeds. To this end, a fast moving drive element, which is rotating about a main axis, comprises a section, which is angled about an orbital angle toward the main axis of the drive shaft and which is situated centrally to a tumble axis. Inside the angled section a transmission element (also depicted as oscillating wheel) is rotatably mounted about a tumble axis which intersects the main axis. Generating a cone-shaped shell, the tumble axis rotates about the main axis with the angular speed of the drive element. Therefore, to a stationary observer the transmission element appears to be oscillating. Two rotating tooth systems have been attached to the transmission element. One of the tooth systems engages in the tooth system of a supporting element. As a result, the transmission element performs, with the rotational frequency of the drive element, an oscillation or precession movement about the main axis. Because of the oscillation movement of the transmission element, the engagement region of the tooth systems rotates about the tooth system of the supporting element. As a result, if the tooth system of the transmission element and the sooth system of the supporting element have the same number of teeth, the transmission element does not change its rotation angle in relation to the supporting element, always coming in contact with the same teeth of both tooth systems. If the number of teeth differs by one tooth the highest transmission stage is achieved because with each revolution of the drive element the transmission element moves only by one tooth in relation to the supporting element. If the number of teeth amount to n teeth on the transmission element or the supporting element and the number of teeth differ by one tooth, n revolutions of the drive element correspond to one revolution of the transmission element. This shows that the transmission ratio of the gear pairing depends on the difference in the number of teeth and the number of teeth. In order to change the oscillation movement into a rotation movement and to transfer the speed of the oscillating transmission element to an output drive element, a second transmission stage is required which is formed by the second tooth system on the transmission element and a tooth system on the output drive element. It is also possible to implement the transmission ratio exclusively by a transmission stage and to design the other one with i=1. In order to adjust a transmission ratio of i=1 between the transmission element and the supporting element, it is also possible to use besides a tooth system other coupling means to produce the torque-proof and axially movable support of the transmission element. The overall transmission ratio of a harmonic drive so defined results from the individual ratio of the number of teeth of all gear pairings, whereas a high number of teeth and minor differences in the number of teeth in the respective gear pairings support the speed reduction from the driving side to the driven side.

Such a harmonic drive is shown in DE 1707499 U. In this case, the drive element has been designed as a drive shaft to which a socket has been attached which has a cylindrical outer contour that is aligned at an angle in the direction of the main axis. As a result, an angled shaft section is formed, the center of which is formed by a tumble axis around which a transmission element is rotating and which is inclined toward the main axis of the drive shaft. On each axial side of the transmission element a tooth system similar to that of a bevel gear has been arranged, which will subsequently be depicted as first and third tooth systems. The third tooth system of the transmission element is engaged with a fourth tooth system that has been arranged at the supporting element, which in this case is designed as a fixed housing cover. As a result, the transmission element that is mounted on the cylindrical outer contour of the angled part of the drive element performs an oscillation movement. The first tooth system of the oscillating wheel is engaged on the opposite side with a second tooth system that is also designed in a bevel gear-like manner and that is positioned at an output drive element. The output drive element is formed by an output drive element comprising the second tooth system and the output shaft which is connected with the output gear and can be rotated about the main axis like the drive element. The number of teeth of the first and second tooth systems and/or the number of teeth of the third and fourth tooth systems are different. In the same way, the number of teeth of the first and third tooth systems on the transmission element can be equal of different.

EP 0078111 B1 shows a harmonic drive with a structure that is similar to the harmonic drive in DE 1707499 U. In this connection, the subject matter of the invention is the special design of the bevel gearing.

DE 19953485 C1 discloses a harmonic drive in which the coupling means between the transmission element and the supporting element are not designed as tooth systems but instead as jaws which have been arranged at the circumference of the transmission element extending radially to the outside. The jaws engage in guide rails fixed in the housing, which guide rails act as coupling means of the supporting element. Since there are an equal number of jaws and guide rails in which the jaws are able to perform an axial movement, the transmission element is torque-proof connected with the supporting element but is able to perform an oscillation movement. A first tooth system at the transmission element designed as bevel gearing engages in the second tooth system at the output drive element which is also designed as bevel gearing. However, the first and second tooth systems differ in the number of teeth. Based on only one change in speed the achievable overall transmission of such an arrangement is considerably lower than with an additional change in speed between the third tooth system arranged at the transmission element and the fourth tooth system arranged at the supporting element, provided there is a difference in the number of teeth.

A May 2003 publication of the company STAM with the title "Report Spacegear—State of Development" shows a harmonic drive having a drive element, a transmission element, a supporting element and an output drive element, whereas also in this case all tooth systems have an axial alignment. However, the first and third tooth systems of the transmission element are not axially arranged opposite the axial outer surfaces of the transmission element but are arranged concentrically one inside the other and point axially in the same direction. Accordingly, the second and fourth tooth systems engaging in the first and third tooth systems are also arranged in concentric manner and opposite the first and third tooth systems.

EP 0332450 A2 shows a harmonic drive which has the same general structure as DE 1707499 U. Here also the teeth are raised in axial direction, similar to a bevel gearing.

The axially aligned bevel gearing is expensive to produce and generates during operation axial forces which have to be supported by means of suitable mounting.

The present invention has the objective to provide a harmonic drive which has a tooth system that is easy to produce.

This objective is achieved by means of the characteristics of claim 1.

A harmonic drive consists of a drive element, a transmission element, a supporting element and an output drive element which are subsequently depicted by the comprehensive term gear members. The drive element is arranged in such a way that it can rotate about a main axis. A tumble axis intersects the main axis under an orbital angle. When the drive element is rotating, the tumble axis rotates together with the drive element about the main axis. The transmission element is arranged in such a way that it can rotate about the tumble axis. A first coupling means has been arranged between the transmission element and the output drive element, and a second coupling means between the transmission element and the supporting element. At least one of the two coupling means is a gear pairing. The term "coupling means" can refer to a tooth system or any other means of producing a form-fit connection. A change in speed takes place between the transmission element and the supporting element and/or between the transmission element and the output drive element.

According to the invention, the tooth systems which form the gear pairing are designed as a spur toothing system. Spur toothing systems are easier to produce than the bevel gearing or the tooth systems designed in bevel gear-like manner known from prior art. For example, it is possible to use the tools used for evolvent gearing. Moreover, the axial forces generated in the radially aligned spur toothing system are considerably lower than those generated in the axially aligned bevel gearing.

Advantageous embodiments of the invention are shown in the dependent claims.

In an advantageous embodiment of the invention, the first coupling means is designed at least as a first gear pairing consisting of a first and a second tooth system, and the second coupling means is designed as a second gear pairing consisting of a third and a fourth tooth system.

In an especially advantageous development of the invention-based object, there is a difference in the number of teeth between the first and the second tooth system and third and the fourth tooth system. By changing the speed twice, it is possible to increase the overall transmission ratio of the harmonic drive.

A further embodiment provides that the first and third tooth systems arranged at the transmission element are designed as external tooth systems, and the second tooth system arranged at the output drive element, as well as the fourth tooth system arranged at the supporting element, are each designed as an internal tooth system.

In an alternative embodiment, the first and third tooth systems arranged at the transmission element are designed as internal tooth systems, and the second tooth system arranged at the output drive element, as well as the fourth tooth system arranged at the supporting element, are each designed as an external tooth system.

A further alternative embodiment provides that the first tooth system arranged at the transmission element and the fourth tooth system arranged at the supporting element are designed as internal tooth systems, and the second tooth system arranged at the output drive element and the third tooth system arranged at the transmission element are designed as external tooth systems.

In this context, a further embodiment of the invention provides that the first tooth system arranged at the transmission element and the fourth tooth system arranged at the supporting element are designed as external tooth systems, and the second tooth system arranged at the output drive element and the third tooth system arranged at the transmission element are designed as internal tooth systems.

In addition, it is possible that the first and the third tooth system arranged at the transmission element are designed as internal tooth systems, and the second tooth system arranged at the supporting element and the fourth tooth system arranged at the output drive element are designed as external tooth systems. To this end, the first and the third tooth system have different diameters and are arranged in concentric manner at the transmission element.

Moreover, according to the invention, it can be provided that the first coupling means is arranged as a tooth system between the transmission element and the output drive element, and the second coupling means is designed as a gimbal ring between the transmission element and supporting element, and that the gimbal ring is torque-proof connected with the supporting element.

In an especially advantageous embodiment of the invention, the coupling means are two gear pairings, respectively, between the gear members, in which the gear engagement is displaced by 180°, making it possible that the radial or circumferential component forces can be compensated by means of the gearing forces. By compensating the components of the radial force or the circumferential force, the bearing load can be advantageously reduced, or it is possible by means of the harmonic drive to achieve higher torque transmission.

To allow for a perfect shifting or smooth movement of the two gear engagements it is necessary that the ratio of number of teeth or the transmission ratio is identical in both gear pairings. This can be achieved, for example, by designing both tooth systems on a respective gear member identical or symmetrical with regard to a specific plane of symmetry. The plane of symmetry for the respective gear member runs through the intersection point of main axis and tumble axis and is vertical to the rotational axis of the respective gear member. The symmetry exists also with regard to the tooth form, number of teeth and gear geometry, because the additional toothing is formed at a first plane by means of reflection of the available single tooth systems. The first plane, which is used to produce additional toothing on the transmission element is vertically penetrated by the tumble axis and runs through the intersection point of main axis and tumble axis. The additional toothing on the supporting element and the output drive element emerge from the reflection of the respective original tooth system available at a second plane, whereas the main axis is positioned in vertical manner on the second plane and the intersection point of tumble axis and main axis is also situated in the second plane. In accordance with the symmetry, the symmetrical toothing is equally spaced from the respective plane.

Because of the symmetry of tooth systems that are arranged on a gear member axially next to one another in one embodiment of the invention both tooth systems are processed continuously so that they are designed as continuous gearing. Similar transmission ratios of both gear pairings between two gear members are achieved in that a first tooth system on a gear member has an integral multiple of the number of teeth of a second tooth system arranged on the same gear member. However, they represent only a theoretical solution because this design involves only disadvantages with regard to production and does not have any benefits.

Basically it is possible with the invention-based object to exchange the functions of the output drive element and the supporting element. However, it has to be noted that this will change the overall transmission of the harmonic drive or the rotating direction of the output drive element.

In an advantageous embodiment of the invention the supporting element is fixed and thus the harmonic drive is designed as stationary gear.

In an alternative embodiment it is possible that the supporting element can be powered and thus the harmonic drive is designed as superimposed transmission.

In an embodiment of the invention, the drive element has an outer contour that is arranged centrally to the tumble axis, and the transmission element is arranged in such a way that it can be rotated about the outer contour by means of a bearing.

All bearings between the gear members or housing can be designed as rolling bearings or as sliding bearings.

In an alternative embodiment, the drive element has an inner contour that is arranged centrally to the tumble axis. The transmission element is arranged in such a way that it can be rotated inside the inner contour by means of a bearing.

It is of special advantage that at least one toothing of a gear pairing is designed as an evolvent spur toothing system having a profile displacement that can be changed over the width of the teeth. Such tooth systems are suitable for adjusting non-parallel axes in cylindrical gear pairing since, because of the changes in diameter of the tooth root and the tooth tip, gear wheels designed in such a way have over the width a conical outer contour. Such tooth systems are also described as beveled gears and can advantageously be produced with the tools for evolvent gearing.

A further embodiment of the invention provides that for reasons of simplified production the first and the third tooth system of the transmission element form a continuous tooth system having the same number of teeth and the same base circle.

In addition it is advantageous that along its main axis the harmonic drive has a central passage. As a result, it is possible, for example, to guide shafts through the harmonic drive for power input and output of other machine parts or cables for transporting working mediums.

A special embodiment of the invention-based object provides a harmonic drive in a control unit of a ship propulsion system for activating a push unit that can be pivoted for navigation. In the control unit an electric motor is located which powers, by means of a spur wheel, a drive element of the harmonic drive, which drive element can be rotated about a main axis. A transmission element that can be rotated about a tumble axis has been arranged at the drive element. Like the output drive element and the supporting element, said transmission element comprises a central passage. In the central passage, a drive shaft has been arranged which can be rotated about the main axis and which powers the propeller shaft. In order to adjust the driving direction, the output drive element is connected with the pivoting push unit.

Embodiments of the invention are shown in the drawings and are subsequently described in more detail.

It is shown:

Figure 1A:
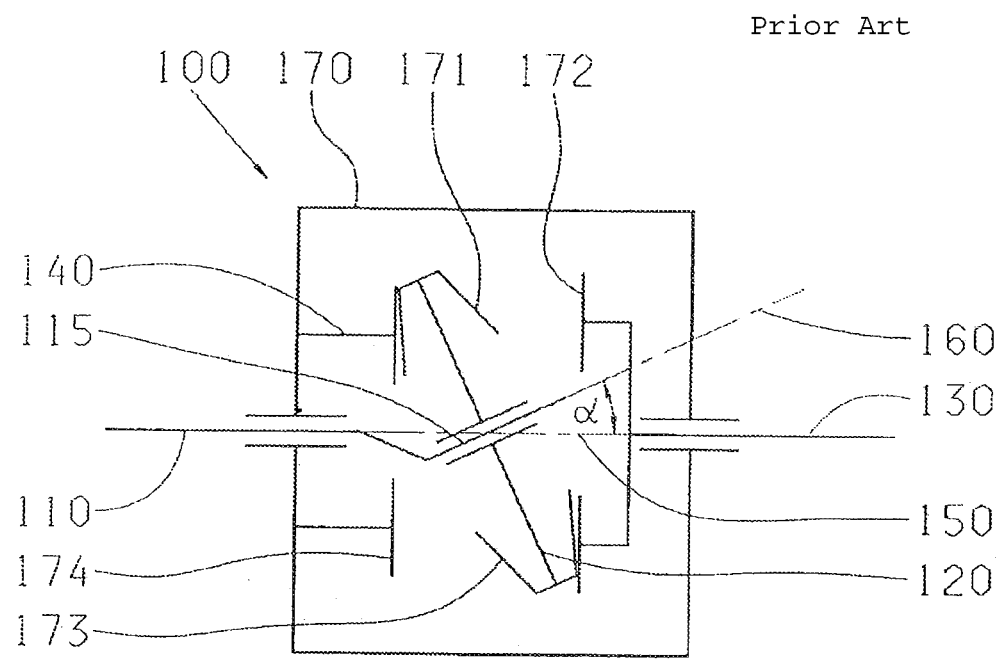
FIG. 1a is a diagram of a harmonic drive with an axially aligned tooth system according to prior art.

FIG. 1a shows a diagram of a harmonic drive 100 as it is disclosed in the prior art. A drive element 110, which is located in a housing 170 and pivoted about a main axis 150, comprises a section 115 which is angled about an orbital angle α and through which a tumble axis 160 is running. On the angled section 115, a transmission element 120 is mounted which can be rotated about the tumble axis 160. At the same time, the tumble axis 160 intersects at an intersection point S the main axis 150 under the orbital angle α and rotates about the main axis 150 with the rotational frequency of the drive element 110. A first tooth system 171 that is arranged on the transmission element 120 engages with a second tooth system 172 that has been arranged at an output drive element 130. Like the drive element 110, the output drive element 130 is pivoted about the main axis 150. A third tooth system 173, which has also been arranged at the transmission element 120, meshes with a fourth tooth system 174 that has been arranged at the supporting element 140. In this example, the supporting element 140 is firmly attached to the housing 170. All tooth systems 171 to 174 are bevel gearings pointing in axial direction or are designed as other tooth systems pointing in axial direction. The drive element 110 is powered with a drive speed. As a result, the tumble axis 160 rotates with the drive element 110 and, because of its toothing, the transmission element 120 performs an oscillation movement with the supporting element 140. Because of the fact that the third tooth system 173 and the fourth tooth system 174 have a difference in the number of teeth, the transmission element 120 turns relative to the stationary supporting element 140, thus reducing the speed of the drive element 110 with a transmission ratio which is calculated from difference in the number of teeth between the third tooth system 173 and the fourth tooth system 174. To be able to lead the oscillation movement of the transmission element 120 in rotary manner out of the harmonic drive, the first tooth system 171 of the transmission element 120 rolls in the second tooth system 172 arranged at the output drive element 130 and, thus, powers the output drive element 130. If there is a difference in the number of teeth between the first tooth system 171 and the second tooth system 172, it is possible to further reduce the drive speed, or the overall transmission of the harmonic drive 100 increases. If there is no difference in the number of teeth in both tooth systems, the transmission element 120 in a rotating drive element 110 would merely be oscillating and turn neither in relation to the supporting element 140 nor in relation to the output drive element 130, so that the output drive element 130 would stop.

Figure 1B:
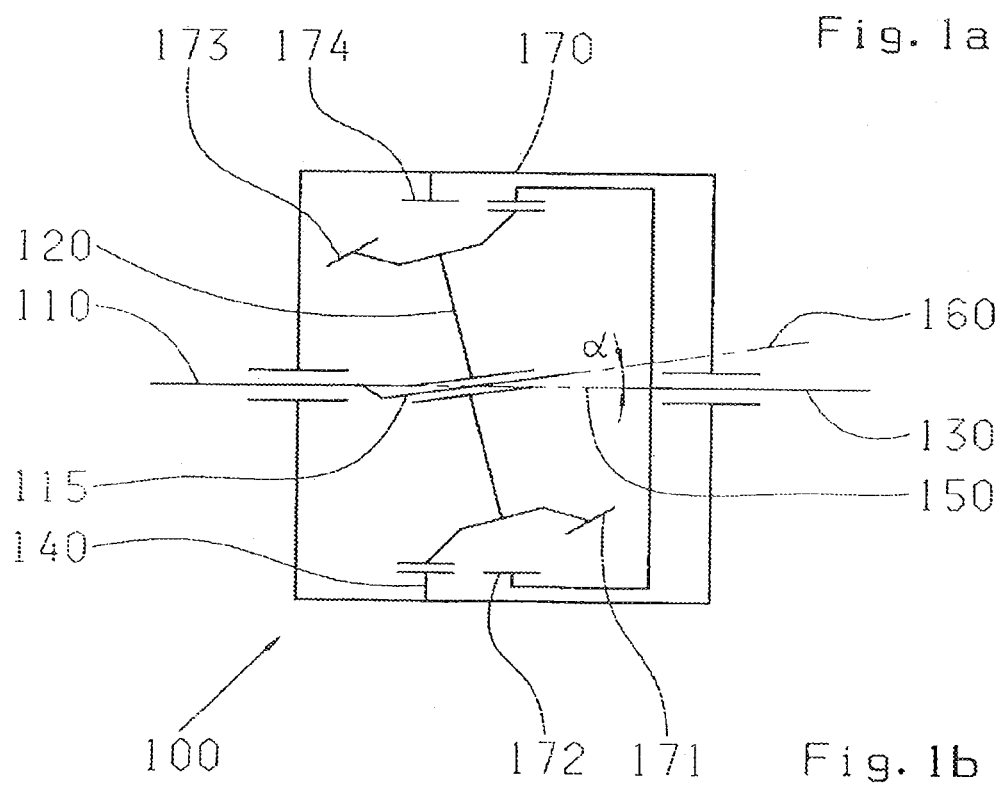
FIG. 1b is a diagram of an invention-based harmonic drive.

FIG. 1*b* shows a diagram of an exemplary embodiment of an invention-based harmonic drive 100. It includes all elements described in FIG. 1*a* and the mode of action described is basically the same. The difference involves the design of the first to the fourth tooth system 171, 172, 173, 174 and the resulting arrangements of the other elements. In contrast to the axially aligned tooth systems known from prior art, the invention-based tooth systems are designed as spur toothing systems and thus radially aligned. The first 171 and the third tooth system 173 at the transmission element 120 are designed as external tooth systems. As a result, the second 172 and the fourth tooth system 174 are inevitably designed as internal tooth systems. To this end, the supporting element 140 is arranged radially to the main axis 150 at the housing 170. This is contrary to the prior art where the supporting element is positioned on the front face of the casing 170. Compared to prior art, the radially aligned tooth systems produce only minor axial forces, and a radially aligned tooth system is easier to produce.

Figure 2:
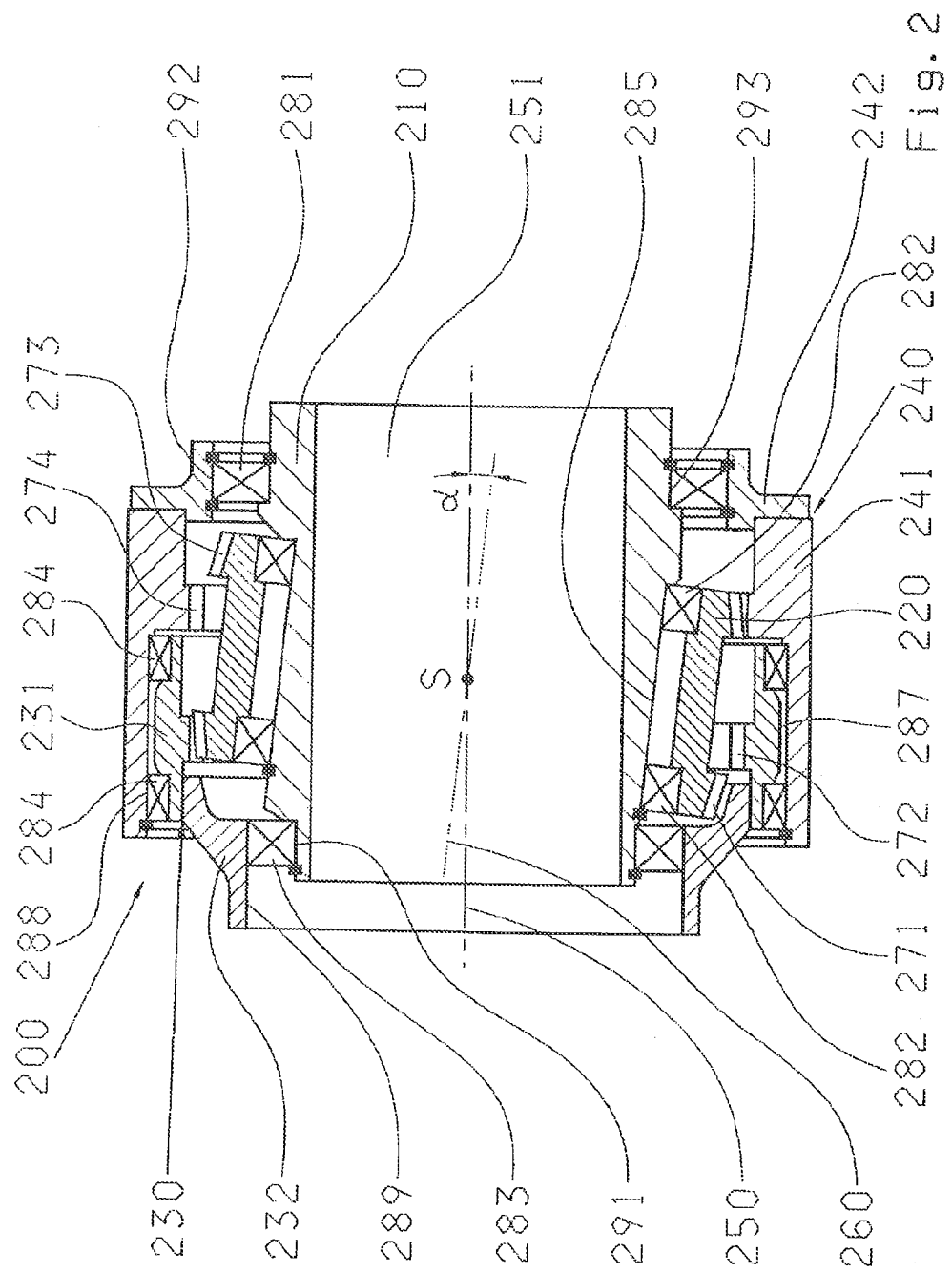
FIG. 2 is a longitudinal cross section of a harmonic drive in which the first and the third tooth system arranged at the transmission element are designed as external tooth systems.

FIG. 2 shows a longitudinal cross-section of a harmonic drive 200 comprising spur toothing systems, in which the first and the third tooth system 271 and 273, which are arranged at the transmission element 220, are designed as external tooth systems. Accordingly, the second 272 and the fourth tooth system 274, which are arranged at an output drive element 230, are designed as internal tooth systems. The drive element 210 is designed as a hollow shaft having a central passage 251. A tumbling outer contour 285 of the drive element 210 through which the tumble axis runs and which is inclined toward the main axis 250 under an orbital angle α carries the second bearing 282 on which the transmission element 220 can rotate about the tumble axis 260. The main axis 250 intersects the tumble axis 260 at an intersection point S under the orbital angle α. The first tooth system 271 which has been arranged at the transmission element 220 engages with the second tooth system 272 which has been arranged at the output drive element 230, with both tooth systems comprising a difference in the number of teeth. The third tooth system 273 which has been arranged at the transmission element 220 engages in the fourth tooth system 274 which has been arranged at the supporting element 240. The third tooth system and the fourth tooth also have a difference in the number of teeth, resulting in a change in speed. In spur toothing systems having non-parallel axes, at least one of the two tooth systems must comprise a tooth form having a profile displacement that can be changed over the width of the teeth to allow for the rolling movement of the spur toothing systems, which are inclined toward each other under an orbital angle α. In the case described, the first tooth system 271 and the third tooth system 273, which have both been arranged at the transmission element 220, comprise a tooth form having a profile displacement that can be changed over the width of the teeth.

The output drive element 230, which can also be rotated about the main axis 250, consists of a hollow wheel 231 in which the tooth system 272 has been arranged and a bearing flange 232, which is firmly attached to the hollow wheel 231, by means of which bearing flange the torque is being transmitted. To pivot the output drive element 230 in the supporting element 240, the two fourth bearings 284 have been arranged between a first outer contour 287 of the hollow wheel 231 and a first inner contour 288 of the hollow wheel 241 associated with the supporting element 240. The third bearing 283 has been arranged between a second inner contour 289 of the bearing flange 232 and a second outer contour 291 of the drive element 210. The supporting element 240 consists of a housing 241 and a bearing cover 242 which are firmly attached to one another. A first bearing 281 has been arranged between a third inner contour 292 of the bearing cover 242 and a third outer contour 293 of the drive element 210. The supporting element 240 can be fixed so that the harmonic drive 200 acts as a stationary gear and the output speed can be calculated from the speed of the drive element 210 and the ratio of the number of teeth between the first 271 and the second tooth system 272 and between the third 273 and the fourth tooth system 274. However, in an alternative embodiment, it is possible that the supporting element 240 is also powered and the harmonic drive acts as a superimposed transmission. In this case, the speed of the supporting element 230 is calculated from the rotational speeds of the drive element 210 and the supporting element 240, as well as the ratios of the number of teeth of the tooth systems 271, 272, 273 and 274. In principal, it is possible in a harmonic drive of the type described that the output drive element 230 is fixed or powered so that is acts as a supporting element and the output takes place via the supporting element 240. However, here the change in speed changes the rotating direction of the element acting as supporting element.

Figure 3:
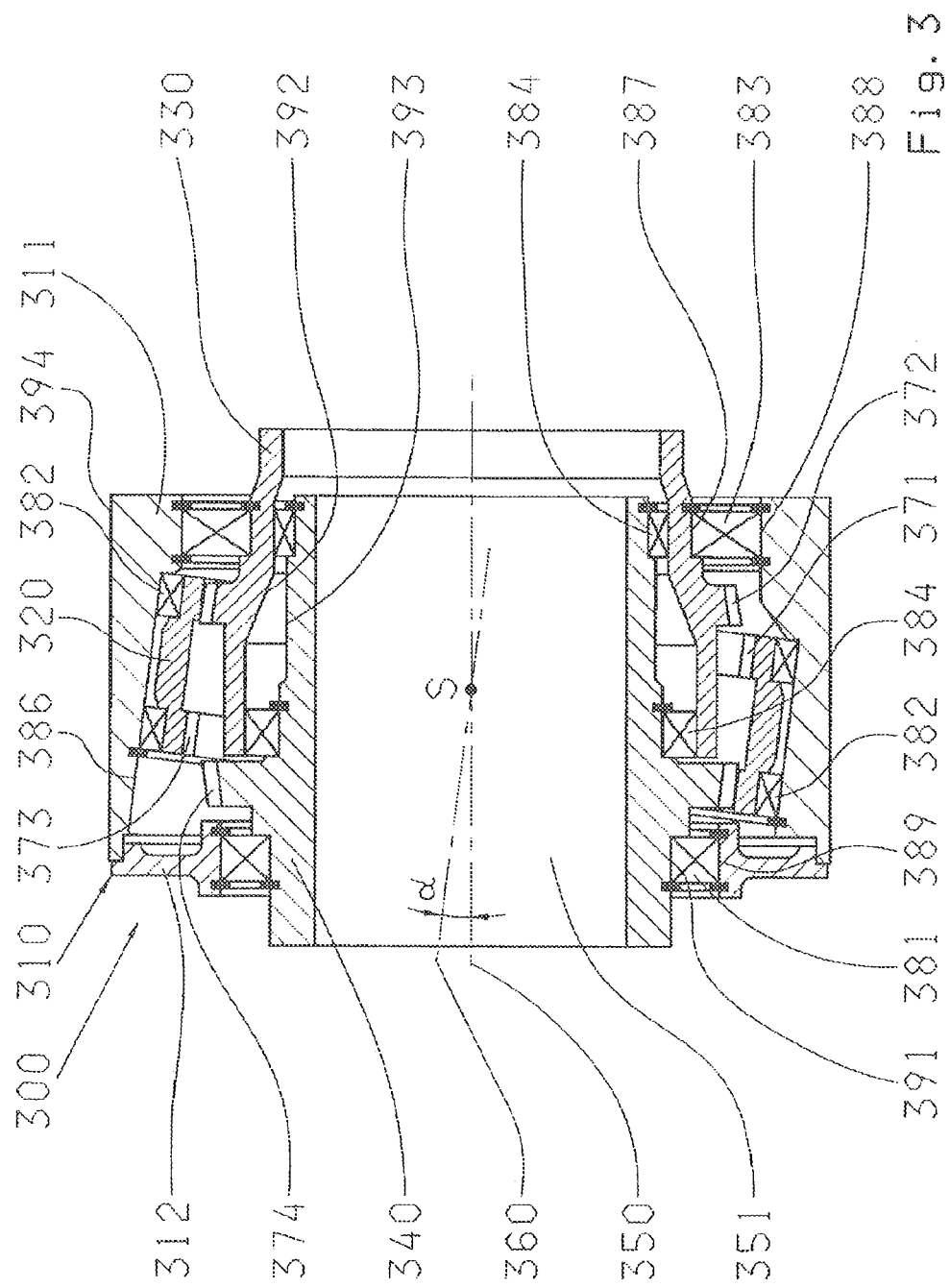
FIG. 3 is a longitudinal cross section of a harmonic drive in which the first and the third tooth system arranged at the transmission element are designed as internal tooth systems.

FIG. 3 shows a longitudinal cut through a harmonic drive 300 in which a first 371 and a third tooth system 373 arranged at a transmission element 320 have been designed as internal tooth systems. The drive element 310 is constructed from a hollow shaft 311 that is firmly attached to a bearing cover 312. The hollow shaft 311 comprises a cylindrical outer contour 394 which has been arranged centrally to a main axis 350 and an inner contour 386, which is tumbling centrally about a tumble axis 360 that is inclined to the main axis 350 by the orbital angle α. The tumble axis 360 intersects the main axis 350 at an intersection point S under the orbital angle α. Because of the cylindrical outer contour 394, the hollow shaft 311 and thus the drive element 310 can be powered radially from the outside. The second bearings 382 have been arranged between the tumbling inner contour 386 and the transmission element 320, resulting in the fact that the transmission element 320 can be rotated about the tumble axis 360. A first tooth system 371, which has been arranged at the transmission element 320, is engaged with a second tooth system 372, which has been arranged at an output drive element 330, whereas both tooth systems have a difference in the number of teeth. The second tooth system 372, which has been arranged at the output drive element 330 that can also be rotated about the main axis 350, comprises a tooth form having a profile displacement that can be changed over the width of the teeth. A third tooth system 373, which is located at the transmission element 320, is engaged with a fourth tooth system 374 that has been arranged at a supporting element 340. These two tooth systems also have a difference in the number of teeth, and the fourth tooth system 374 has a profile displacement that can be changed over the width of the teeth. A third bearing 383 has been arranged between a first outer contour 387 at the output drive element 330 and a first inner contour 388 at the drive element 310. As a result, the drive element 310 and the output drive element 330 can be decoupled from one another and rotate about the main axis 350. A first bearing 381 has been arranged between a second inner contour 389 of the drive element 310, or the bearing cover 311, and a second outer contour 391 of the supporting element 340. For the purpose of centering the output drive element 330 on the supporting element 340, the fourth bearings 384 have been arranged between a third inner contour 392 of the output drive element 330 and a third outer contour 393 of the supporting element 340. In this connection, the number of the bearings between the respective transmission parts is determined by structural parameters and operational forces and can differ from the number depicted. Because of the fact that the supporting element 340 and the output drive element 330 are designed in hollow-shaped manner, the harmonic drive 300 comprises a central output 351.

When the drive element 310 is rotated, the transmission element 320 performs an oscillation movement, during which it runs down by means of the third tooth system 373 into the fourth tooth system 374 of the supporting element 340 and turns toward the supporting element 340 with each revolution of the drive element 310 about the difference in the number of teeth between the third 373 and the fourth tooth system. This twisting is transferred to the output drive element 330, whereas the difference in the number of teeth between the first 371 and the second tooth system 372 results in a further change in speed. Even in this case, the harmonic drive 300 can be designed alternatively as a stationary gear having a fixed supporting element 340 or as an epicyclic gear having a powered supporting element. Furthermore, it is possible to switch the functions of the output drive element 330 and the supporting element 340 by changing the transmission or the portents.

Figure 4:
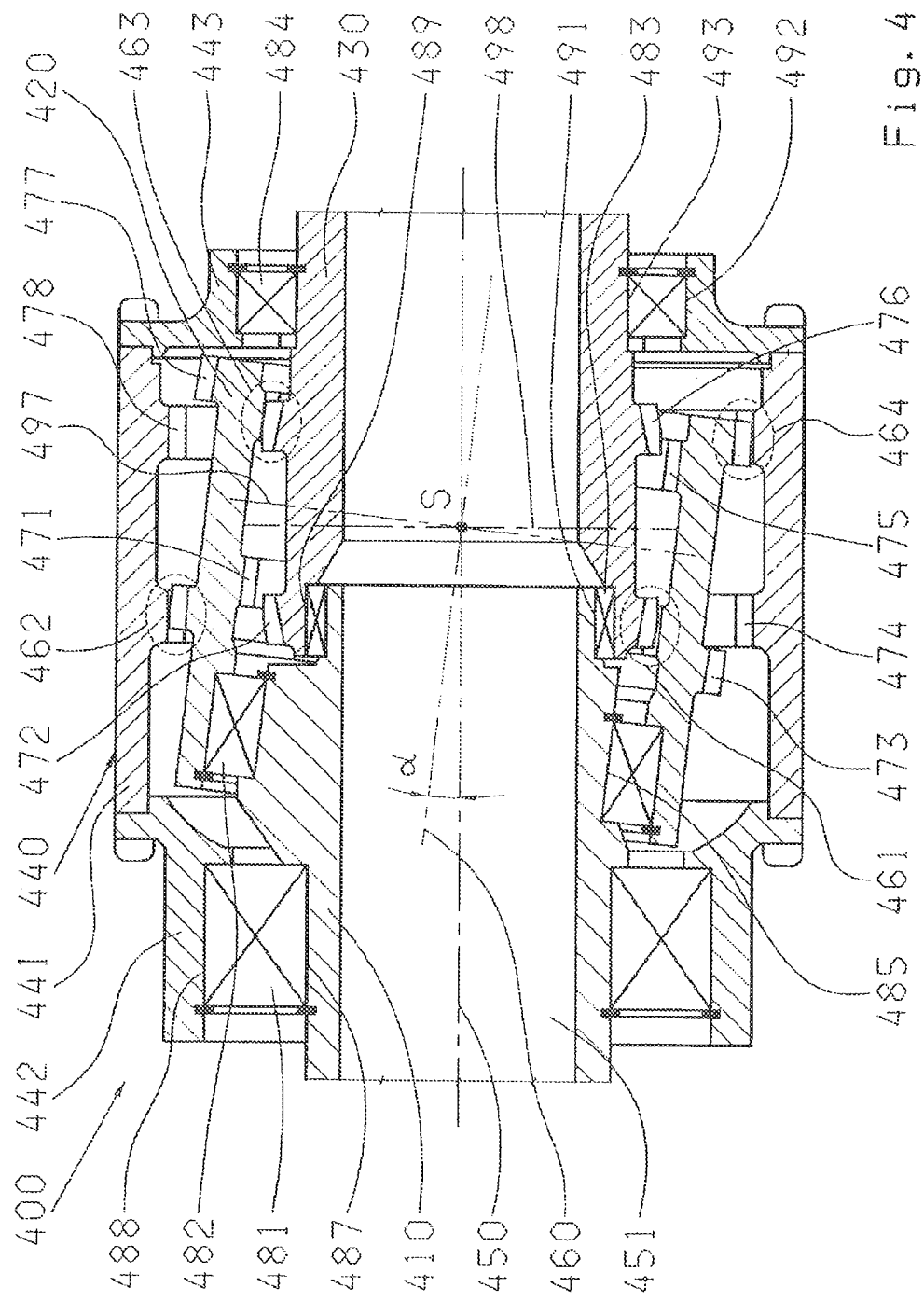
FIG. 4 is a longitudinal cross section of a harmonic drive in which the tooth systems arranged at the transmission element comprise at least an external tooth system and at least as an external tooth system.

The harmonic drive depicted in FIG. 4 consists of a drive element 410, a transmission element 420, an output drive element 430 and a supporting element 440, which are constructed from a housing 441, a first bearing cover 442, which is firmly attached to the housing 441, and a second bearing cover 443, which is also firmly attached to the housing 441. By means of a first bearing 481, which has been arranged between a first inner contour 488 of the first bearing cover 442 and a first outer contour 487 of the drive element 410, the drive element 410 is pivoted about a main axis 450. A second bearing 482 has been arranged between a tumbling outer contour 485 of the drive element and the transmission element 420, allowing the transmission element 420 to rotate about a tumble axis 460. The tumbling outer contour 485 is centered by means of the tumble axis 460, which intersects the main axis in the intersection point S under the orbital angle α. The output drive element 430, which is powered by the transmission element 420 carries a fourth bearing 484 on a third outer contour 493 that is inserted in a third inner contour 492 of the second bearing cover 443 associated with the supporting element 440. The drive element 410 and the output drive element 430 are centering each other by means of a third bearing 483 which has been arranged between a second outer contour 491 of the supporting element and a second inner contour 489 of the output drive element.

A first tooth system 471 arranged at the transmission element 420 has been designed as an internal tooth system which engages in a first gear engagement 461 with a second tooth system 472 which located at the output drive element 430 and which is designed as an external tooth system having a profile displacement that can be changed over the width of the teeth. A third tooth system 473 in the form of an external tooth system which has been arranged at the transmission element 420 and which has a profile displacement that can be changed over the width of the teeth meshes in a second gear engagement 462 with the fourth tooth system 474 designed as an internal tooth system at the supporting element 440. As a result, the transmission element 420 has been arranged in radial manner between the output drive element 430 and the supporting element 440. This design makes it possible for an additional tooth system to be placed axially offset on the transmission element in order to transmit the power from the transmission element to the supporting element and the output drive element, respectively. As a result, in addition to the first tooth system 471, there is a fifth tooth system 475 which is also designed as an internal tooth system. The fifth tooth system engages in a sixth tooth system 476 (forming together a third gear engagement 463) which is located at the output drive element 430 and is designed as an external tooth system having a profile displacement that can be changed over the width of the teeth. Axially offset to the third tooth system 473 with external gears, a seventh tooth system 475 has been arranged at the transmission element 420 which tooth system also comprises external gears and that has a profile displacement that can be changed over the width of the teeth. The seventh tooth system engages in a fourth gear engagement 464 with an eighth tooth system 478 which is axially offset to the fourth tooth system having respective internal gears. The third gear engagement 463 of the additional tooth systems 475 and 476 between the transmission element 420 and the output drive element 430 occurs between the two gear members offset by 180° to the first gear engagement 461. The fourth gear engagement 464, which is formed between the transmission element 420 and the supporting element 440 in addition to the second gear engagement 462, is also offset by 180° to the second gear engagement 462. This causes the gearing forces to compensate undesired circumferential force and radial force components and reduces the bearing load.

To guarantee perfect rolling, or a non-jamming process, in the paired gear engagement, there has to be a consistency in the transmission ratios and the ratio in the number of teeth of both gear pairings, which is here achieved with regard to the plane of symmetry by means of a symmetric design in reference to gear geometry and number of teeth of the first 471 and the fifth tooth system 475, the second tooth system 472 and the sixth tooth system 476, the third 473 and the seventh tooth system 477, and the fourth 474 and the eighth tooth system 478. This plane of symmetry runs through the intersection point S and is in vertical position on the rotational axis of the respective gear member. As a result, the first 471 and the fifth tooth system 475 arranged at the transmission element 420, as well as the third 473 and the seventh tooth system 477 are situated in symmetric manner to a first plane 497 which runs through the intersection point S and which is vertically penetrated by the tumble axis 460. The second 472 and the sixth tooth system 476 arranged at the output drive element 430 are situated in symmetrical manner to a second plane 498 which runs through an intersection point S and which is vertically penetrated by the main axis 450. The second plane 498 applies also to the symmetry of the fourth 474 and the eighth tooth system 478, which have been arranged at the supporting element 440. It is not necessarily required that the teeth align around the circumference, but it can be of advantage in production, especially if both tooth systems can be produced in one processing step.

Besides symmetrical conditions between the tooth systems that are respectively meshed in pairs to guarantee perfect rolling, it is also possible to provide a corresponding ratio of the number of teeth in which the two gear pairings differ in the number of teeth. In order to achieve an equal ratio of the number of teeth in both gear pairings, the tooth systems arranged at the respective gear member must have an integral relation to each other. However, this possibility is of importance only theoretically because it does not have any advantages or disadvantages from the aspect of production.

To achieve the highest possible change in speed in the harmonic drive 400, the tooth systems on the transmission element and tooth systems on the output drive element or supporting element have a respective difference in the number of teeth. If there is only a minor distance between two tooth systems arranged on the transmission element, the supporting element or the output drive element and the plane of symmetry, it is possible to design at least the tooth systems having a constant profile displacement over the width of the teeth with a continuous tooth system for the purpose of mutual processing.

Even the harmonic drive in FIG. 4 can operate as stationary gear having a fixed supporting element 440 and as epicyclic gear having a powered supporting element 340. Furthermore, it is possible even in this case to switch the functions of the supporting element and output drive element by changing the transmission or the rotational direction.

Figure 5:
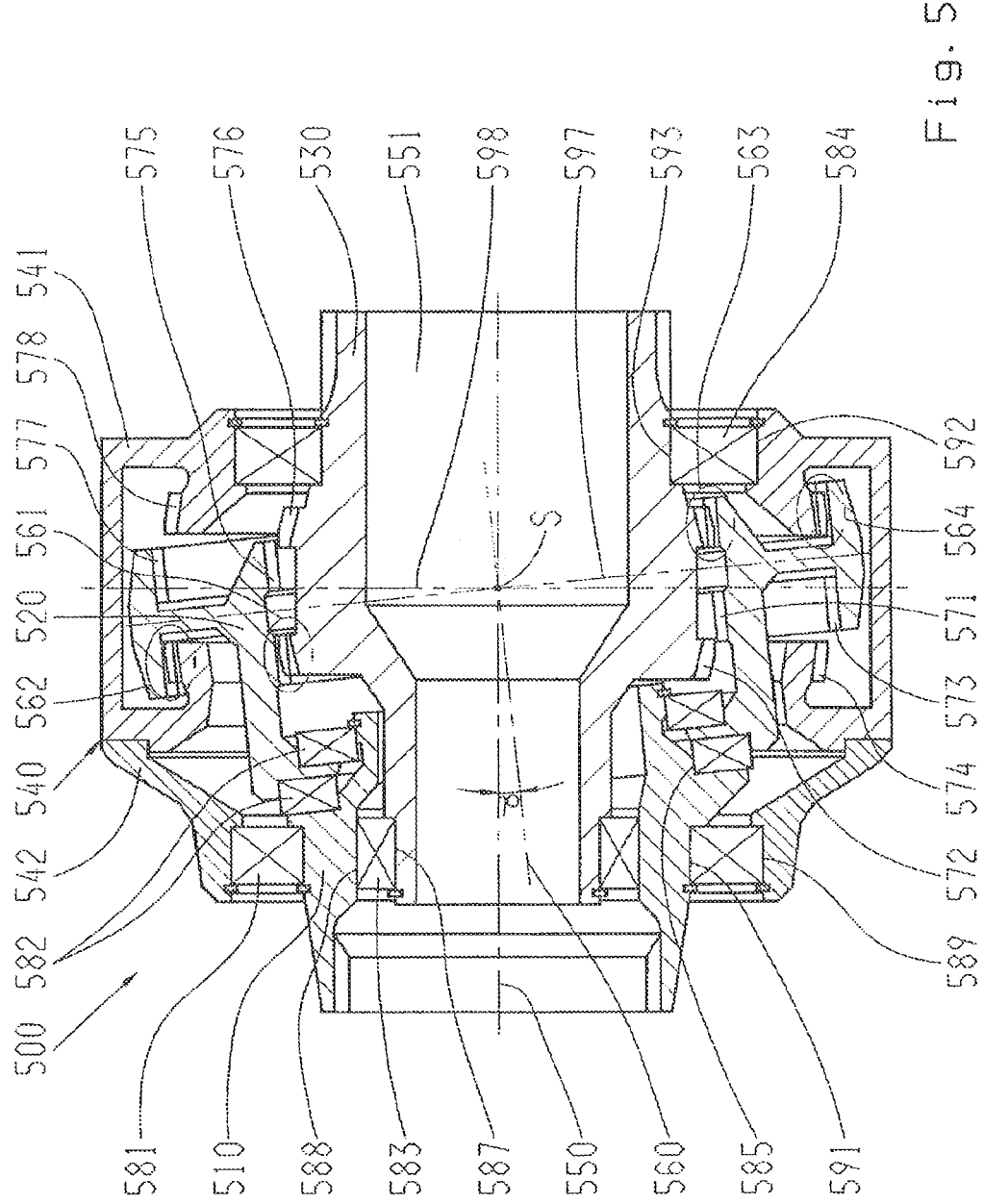
FIG. 5 is a longitudinal cross section of a harmonic drive in which the tooth systems arranged at the transmission element are each designed as an internal tooth system.
Figure 6:
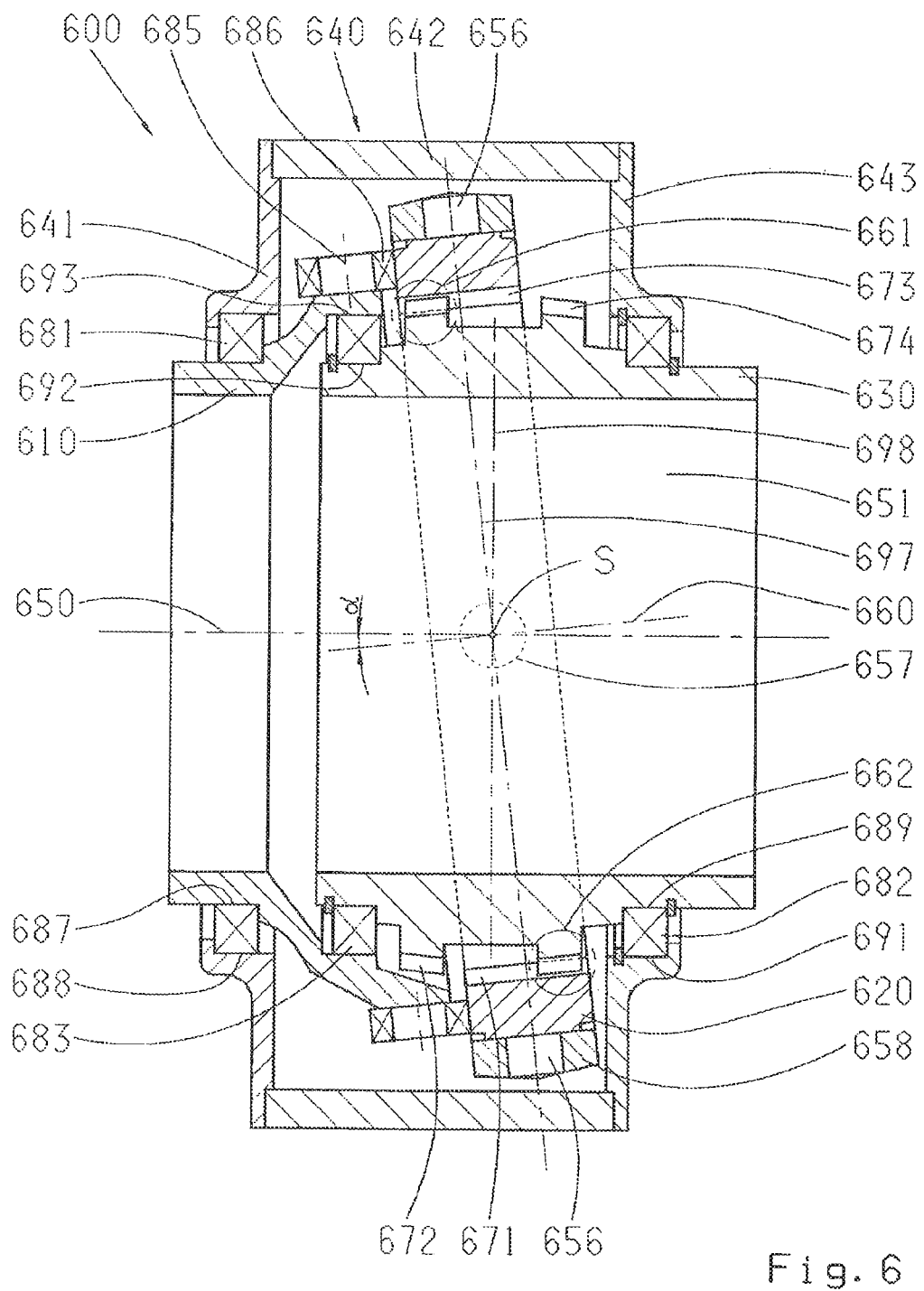
FIG. 6 is a longitudinal cross section of a harmonic drive in which the coupling means located between the transmission element and the supporting element comprises a gimbal ring.

In a longitudinal cut of the harmonic drive 500 shown in FIG. 5, a drive element 510 located at a second outer contour 591 carries a first bearing 581, which has been arranged radially to the outside at a second inner contour 589 of a bearing cover 542. As a result, the drive element 510 is pivoted about a main axis 550 in the bearing cover 542. At the same time, the bearing cover 542 is firmly attached with a housing 541, forming together a supporting element 540. A tumbling outer contour 585 of the drive element 510, which has been designed centrally to a tumble axis 560, is inclined to the main axis by an orbital angle α and carries two second bearings 582 on which a transmission element 520 is pivoted about the tumble axis 560. The tumble axis 560 intersects at an intersection point S the main axis 550 under the orbital angle α. On the third inner contour 593, an output drive element 530 carries a fourth bearing 584, which has been arranged radially at a third inner contour 592 of the housing 541 associated with the supporting element 540. A third bearing 583 has been arranged between a first outer contour 587 at the left end of the output drive element 530 which has the shape of a hollow shaft and a first inner contour 588 of the drive element 510 which is also shaped as a hollow shaft. Both third bearings 583 and the fourth bearing 584 allow the output drive element 530 to rotate about the main axis 550. Because the drive element 510 and the output drive element are designed as hollow shafts, the harmonic drive 500 has a central passage 551. A first 571 and a third tooth system 573, both of which are designed as spur toothing systems with internal tooth systems, have been arranged on different radii at the transmission element 520. In axial direction, respectively designed as spur toothing systems with internal tooth systems, an additional fifth tooth system 575 is provided next the first tooth system 571, and an additional seventh tooth system 577 is provided next to the third tooth system 573. The first tooth system 571 engages in a first gear engagement 561 with a second tooth system 572 arranged at an output drive element 530, and the fifth tooth system 575 engages in a third gear engagement 563 with a sixth tooth system 576 which has also been arranged at the output drive element 530. To this end, the second 572 and the sixth tooth system 576 are designed as spur toothing systems with external tooth systems having a profile displacement that can be changed over the width of the teeth. As shown in FIG. 6, the first gear engagement 561 is offset to the third gear engagement 563 by 180° over the circumference of the tooth systems, compensating the radial components resulting from the gearing forces.

In the same way, this applies to the third tooth system 573, which has been arranged at the transmission element 520. The third tooth system engages in a second gear engagement 562 with a fourth tooth system 574 which has been arranged at a supporting element 540. This also applies to the seventh tooth system 577 which, in addition to the third tooth system 573, has also been arranged at the transmission element 520. The seventh tooth system forms together with an eighth tooth system 578, which has been arranged at the supporting element 540, a fourth gear engagement 564. Also in this case, the gear engagements of the two gear wheel pairings are offset to each other by 180°. The fourth 574 and the eighth tooth system 578 are designed as external tooth systems having a profile displacement that can be changed over the width of the teeth.

To guarantee perfect rolling, or a non-jamming process, in the paired gear engagement, there has to be a consistency in the transmission ratios or the ratio in the number of teeth of both gear pairings, which is here achieved by means of a symmetric design of the first 571 and the fifth tooth system 575, the second 572 and the sixth tooth system 576, the third 573 and the seventh tooth system 577, and the fourth 574 and the eighth tooth system 578. This plane of symmetry runs through the intersection point S and is in vertical position on the rotational axis of the respective gear member. As shown in FIG. 4, the significance of the symmetry of the respective tooth systems is that they have an equal number of teeth and identical gear geometry. It is not necessarily required that the teeth align around the circumference, but it can be of advantage in production, especially if both tooth systems can be produced in one processing step. In the case of a profile displacement that can be changed over the width of the teeth, the gear geometries are laterally reversed to each other with regard to the plane of symmetry. As a result, the first 571 and the fifth tooth system 575 arranged at transmission element 520, as well as the third 573 and the seventh tooth system 577 are situated in symmetric manner to a first plane 597 which runs through the intersection point S and which is vertically penetrated by the tumble axis 560. The second 572 and the sixth tooth system 576 arranged at the output drive element 530 are situated in symmetrical manner to a second plane 598, which runs through the intersection point S and is vertically penetrated by the main axis 550. The second plane 598 applies also to the symmetry of the fourth 574 and the eighth tooth system 578, which have been arranged at the supporting element 540.

FIG. 4 also shows that a symmetrical tooth system by means of reflection in axial direction can only be realized if the first 571 and the third tooth system 573 of the transmission element 520 have different diameters.

The harmonic drive 500 can also operate as a stationary gear having a fixed supporting element 540 or as an epicyclic gear having a powered supporting element. Furthermore, also in this case, it is possible to switch the functions of the supporting element and the output drive element by changing the transmission or the rotational direction.

FIG. 6 shows a longitudinal cross section of a harmonic drive 600, which consists of a drive element 610, a transmission element 620, an output drive element 630 and a supporting element 640. The supporting element 640 is formed by a first bearing cover 641, a centerpiece of the housing 642 and a second bearing cover 643. Like the hollow-shaped output drive element 630, the hollow-shaped drive element 610 comprises a central passage 651, which makes it possible that mechanical power trains or cables can be guided centrally through the harmonic drive. By means of a first bearing 681, which has been arranged between a first outer contour 687 of the drive element 610 and a first inner contour 688 of the first bearing cover 641, the drive element 610 is pivoted about a main axis 650. By means of a second bearing 682, which has been arranged between a second outer contour 689 at the output drive element 630 and a second inner contour 691 of the first bearing cover 643, the output drive element 630 is also pivoted about a main axis 650. By means of a third bearing 683, which has been arranged between a third outer contour 692 of the output drive element 630 and a third inner contour 693 of the drive element 610, the output drive element 630 is centered on the drive element 610. A first coupling means, which has been arranged between transmission element 620 and output drive element 630, consists of two gear pairings. A second coupling means arranged between the transmission element 620 and the supporting element 640 is designed as a gimbal and consists of two first pivot bolts 656, two second pivot bolts 657 and a gimbal ring 658. Here, the transmission element 620 is pivoted in the gimbal ring 658 by means of the first pivot bolts 656, which are situated radially opposite of each other and which form a rotational axis. The second pivot bolts 657 are also situated radially opposite of each other and, forming a rotational axis, they are firmly attached in the centerpiece of the housing 642 of the supporting element 640. At the same time, the gimbal ring 658 is pivoting about the second pivot bolts 657 and connected with them. The first 656 and the second pivot bolts 657 are offset by 90° arranged at the circumference of the gimbal ring 658, so that the rotational axes running through the respective pivot bolts are positioned in vertical manner on top of each other.

A tumbling contour of the drive element 610 and thus the orbital angle $\alpha$ of a tumble axis 660 is formed by the arrangement and position of at least two rolling elements 686. The rolling elements are pivoted about a mutual unwinding axis 685 which is situated at an angle of 90°-$\alpha$ toward the main axis 650 and which intersects with the main axis. The position of the unwinding axis 685, which rotates with the drive element 610, determines the position of the tumble axis 660. The rolling elements 686 roll off the gimbal-suspended transmission element 620 and transfer it into an oscillation movement. Since, with regard to the main axis 650, the gimbal ring 658 is situated in torque-proof manner in the supporting element 640, the supporting element 620 performs merely an oscillation movement, a rotation relative to the supporting element 640 is not possible. The transmission element 620 comprises a first tooth system 671 with internal toothing which engages in a second tooth system 672 located at the output drive element 630. Said second tooth system 672 comprises external toothing and has a profile displacement that can be changed over the width of the teeth. Between the first 671 and the second tooth system 672 there is a difference in the number of teeth, resulting in a change in speed from the high speed of the drive element 610 to the slowly turning output drive element 630.

A third tooth system 673, which is situated symmetrically to the first tooth system 671, has been designed at the transmission element 620 with regard to a first plane 697. Said third tooth system 673 engages with a fourth tooth system 674 arranged at the output drive element 630. With regard to a second plane 698, the fourth tooth system 674 is situated symmetrically to the second tooth system 672 and emerges by means of a reflection at the second plane 698. The symmetry of the respective tooth systems signifies a mirror image correspondence of the gear geometry, tooth form and number of teeth. Such correspondence guarantees a non-jamming process of the gear wheel pairings. The first plane 697 is situated vertically on the tumble axis and comprises the intersection point S between tumble axis 660 and main axis 650. The second plane 698 also comprises the intersection point S but is penetrated vertically by the main axis 650. Because of the minor distance between the first 671 and the third tooth system 673 and the identical gear geometry, the first 671 and the third tooth system 673 are simply produced in one processing step with continuous gearing. A first gear engagement 661 between the first 671 and the second tooth system 672 is offset by 180° toward a second engagement 662 between the third 673 and the fourth 674 tooth system, thus compensating the radial gearing forces. Moreover, an additional engagement of the teeth increases the transferable torque. The external position of the gimbal ring has the advantage that only a change in speed allows for a central passage. An ordinary change in speed increases the efficiency of the harmonic drive.

Figure 7:
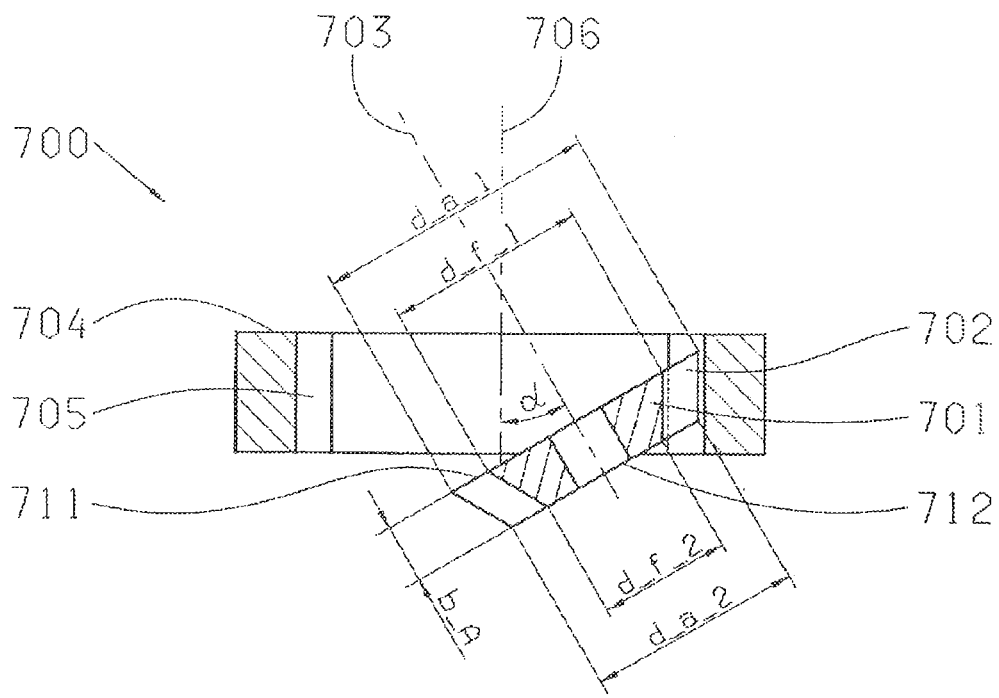
FIG. 7 is a diagram of a longitudinal cross section of a spur wheel with an external tooth system having a profile displacement that can be changed over the width of the teeth that the spur wheel engages in a hollow wheel having constant profile displacement.

FIG. 7 shows a sectional drawing of the gearing process for a spur-wheel stage 709 having non-parallel axes. To this end, a first wheel 701 with external toothing is engages with a second wheel 704 with internal toothing. A first axis 703 about which the first wheel can be rotated is inclined by an angle $\alpha$ toward an axis 706 that is situated centrally to the second wheel 704. This would result in defective mesh conditions which, however, can be corrected by changing the gear geometry on at least one of the wheels 701 and 704. In this case, the second tooth system 705 arranged at the second wheel 704 has been designed as a straight internal tooth system. The tooth form of the first tooth system 702 comprises a profile displacement that can be changed over the width of the teeth $b\_A$. Because of the changeable profile displacement, a first outside diameter $d\_a\_1$ on one surface 711 of the first wheel 701 is larger than a second outside diameter $d\_a\_2$ on a second surface 712 of the first wheel 701. The same applies to a first root diameter $d\_f\_1$ in relation to a second root diameter $d\_f\_2$. This results in an outer cylindrical contour in the region of the head and base of the gear that compensates for the disruptive effect of the angle $\alpha$ for the gear engagement. In the case of a harmonic drive, the first axis 703 is described as a tumble axis because it rotates about the second axis 706, and the first wheel 701 performs a rotational movement relative to the first axis 703, which a stationary observer perceives as an oscillation movement.

Figure 8:
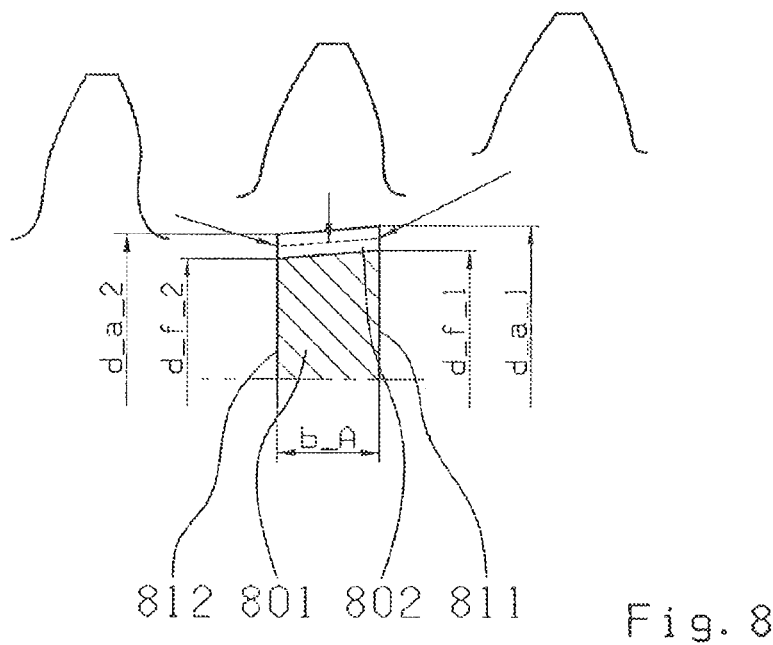
FIG. 8 is a diagram of a longitudinal cross section of a spur wheel with external gears having a profile displacement that can be changed over the width of the teeth, and a representation of a tooth form over the width.

FIG. 8 shows a diagram of a longitudinal cut of the tooth form of a wheel 801 with external toothing, which comprises a tooth system 802 having a profile displacement that can be changed over the width of the teeth $b\_A$. Because of the changeable profile displacement, a first outside diameter $d\_a\_1$ on the first surface 811 of the wheel 801 is larger than a second outside diameter $d\_a\_2$ on a second surface 812 of the wheel 801. The same applies to a first root diameter $d\_f\_1$ in relation to a second root diameter $d\_f\_2$. This results in an outer cylindrical contour in the region of the head and base of the gear. The cross-sectional shapes of three gears at the first surface 811 of the width of the gear, at the second surface 812, and in the center show how the tooth form changes over the width of the teeth $b\_A$.

Figure 9:
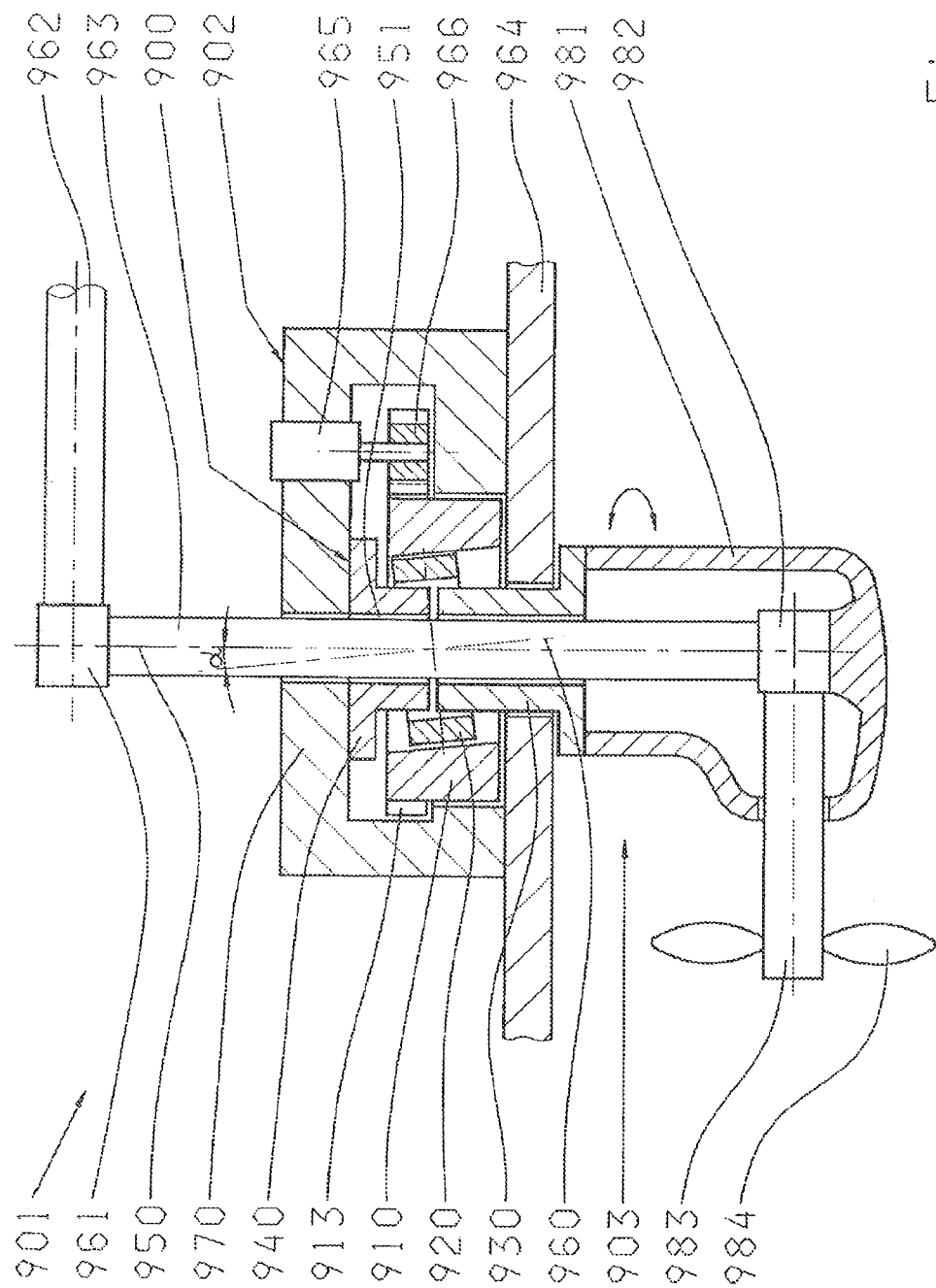
FIG. 9 is a diagram of a harmonic drive for controlling ship propulsion.

By means of a diagram, FIG. 9 shows an exemplary use of the harmonic drive 900 in controlling a ship propulsion system 901. In this case, the ship propulsion system 901 comprises a control unit 902, a thrust unit 903 designed as a steerable propeller, and a first 962 and second drive shaft 963, as well as a first angle drive 961. Here, the first 962 and the second drive shaft 963 are coupled by means of the first angle drive 961 which is firmly attached in a ship's hull 964. The control unit 902 comprises a harmonic drive 900, an electric motor 965 having a spur wheel 966, as well as a control housing 970 and is also located in the ship's hull 964. The harmonic drive 900 is formed by a drive element 910, a transmission element 920, an output drive element 930 and a supporting element 940. The arrangement and design of the gear members corresponds with the type described in FIG. 4. To this end, the transmission element 920, the output drive element 930 and the supporting element 940 are situated in radial manner inside the drive element 910. Because of the hollow shape of the output drive element 930 and the supporting element 940, the harmonic drive 900 comprises a central passage 951. The drive element 910 and the output drive element 930 are pivoted about a main axis 950. In addition to the representation shown in FIG. 4, the drive element 910 has a driving gear 913 at its outer circumference. The supporting element 940 is firmly attached to the control housing 970. The spur wheel 986 of the electric motor 965, which is also firmly attached to the control housing 970, is engaged with the spur toothing 913 of the drive element 910. The output drive element 930 is firmly attached to the housing 981 of the thrust unit 903 which is pivoting about the main axis 950 in the ship's hull 964. The thrust unit 903 consists of the housing 981, a propeller shaft 983 which is pivoted in the housing 981 and which has an attached propeller 984, as well as a second angle drive 982 which is firmly attached to the housing 981. The propeller shaft 983 is coupled with the second shaft by means of the second angle drive 982. The first drive shaft 962 is powered by a motor of the ship. In the first angle drive 961, the rotational movement is diverted to the second drive shaft 963. The second drive shaft 963 is pivoted about the main axis 950 and is guide from the inside of the ship's hull to the bottom side of the ship and into the thrust unit 903. There, in a second angle drive 982, the rotational movement of the second drive shaft 963 is diverted in horizontal direction to the propeller shaft 963, thus powering the propeller.

To change course, the thrust unit 903 is swiveled about the main axis 950, changing the direction of the propeller thrust. If a change of direction is desired, the mechanical energy required to swivel the thrust unit is produced by the electric motor 965. It is now the objective of the harmonic drive 900 to change the high speed of the electric motor 965 to a lower angular velocity of the thrust unit. The first transmission stage forms the spur wheel 966 of the electric motor 965 and the driving gear 913 of the drive element where, because of the large difference in diameter, the speed of the drive element 910 is considerably lower than that of the electric motor 965. In accordance with the effectiveness of the harmonic drive, the speed continues to be reduced to the output drive element, which makes it possible that an actuation of the electric motor 965 results in a sensitive control movement.

Reference Numerals
100 harmonic drive
110 drive element
115 angled section of the drive element
120 transmission element
130 output drive element
140 supporting element
150 main axis
160 tumble axis
170 housing
171 first tooth system
172 second tooth system
173 third tooth system
174 fourth tooth system
200 harmonic drive
210 drive element
220 transmission element
230 output drive element
231 hollow wheel of the output drive element
232 flange of the output drive element
240 supporting element
241 housing of the supporting element
242 bearing cover of the supporting element
250 main axis
251 central passage
260 tumble axis
271 first tooth system
272 second tooth system
273 third tooth system
274 fourth tooth system
281 first bearing
282 second bearing
283 third bearing
284 fourth bearing
285 tumbling outer contour of the drive shaft
287 first outer contour
288 first inner contour
289 second inner contour
291 second outer contour
292 third inner contour
293 third outer contour
300 harmonic drive
310 drive element
311 hollow shaft of the drive element
312 bearing cover of the drive element
320 transmission element
330 output drive element
340 supporting element
350 main axis
351 central passage
360 tumble axis
371 first tooth system
372 second tooth system
373 third tooth system
374 fourth tooth system
381 first bearing
382 second bearing
383 third bearing
384 fourth bearing
386 tumbling inner contour of the drive element
387 first outer contour at the output drive element
388 first inner contour
389 second inner contour
391 second outer contour
392 third inner contour
393 third outer contour
394 cylindrical outer contour
400 harmonic drive
410 drive element
420 transmission element
430 output drive element
440 supporting element
441 housing of the supporting element
442 first bearing cover of the supporting element
443 second bearing cover of the supporting element
450 main axis
451 central passage
460 tumble axis
461 first tooth engagement
462 second tooth engagement
463 third tooth engagement
464 fourth tooth engagement
471 first tooth system
472 second tooth system
473 third tooth system
474 fourth tooth system
475 fifth tooth system
476 sixth tooth system
477 seventh tooth system
478 eighth tooth system
481 first bearing
482 second bearing
483 third bearing
484 fourth bearing 485 tumbling outer contour of the drive shaft
487 first outer contour
488 first inner contour
489 second inner contour
491 second outer contour
492 third inner contour
493 third outer contour
497 first plane
498 second plane
500 harmonic drive
510 drive element
520 transmission element
530 output drive element
540 supporting element
541 housing of the supporting element
542 bearing cover of the supporting element
550 main axis
551 central passage
560 tumble axis
561 first tooth engagement
562 second tooth engagement
563 third tooth engagement
564 fourth tooth engagement
571 first tooth system
572 second tooth system
573 third tooth system
574 fourth tooth system
575 fifth tooth system
576 sixth tooth system
577 seventh tooth system
578 eighth tooth system
581 first bearing
582 second bearing
583 third bearing
584 fourth bearing
585 tumbling outer contour of the drive shaft
587 first outer contour
588 first inner contour
589 second inner contour
591 second outer contour
592 third inner contour
593 third outer contour
597 first plane
598 second plane
600 harmonic drive
610 drive element
620 transmission element
630 output drive element
640 supporting element
641 first bearing cover
642 centerpiece of the housing
643 second bearing cover
650 main axis
656 first pivot bolt
657 second pivot bolt
658 gimbal ring
660 tumble axis
661 first tooth engagement
662 second tooth engagement
671 first tooth system
672 second tooth system
673 third tooth system
674 fourth tooth system
681 first bearing
682 second bearing
683 third bearing
685 unwinding axis
686 rolling element
687 first outer contour
688 first inner contour
689 second inner contour
691 second outer contour
692 third inner contour
693 third outer contour
697 first plane
698 second plane
700 spur-wheel stage
701 first wheel
702 first tooth system
703 first axis
704 second wheel
705 second tooth system
706 second axis
711 first surface
712 second surface
801 wheel with external toothing
802 tooth system
811 first surface
812 second surface
900 harmonic drive
901 ship propulsion system
902 control unit
903 thrust unit
910 drive element
913 driving gear of the drive element
920 transmission element
930 output drive element
940 supporting element
541 housing of the supporting element
950 main axis
951 central passage
961 first angle drive
962 first drive shaft
963 second drive shaft
964 ship's hull
965 electric motor
966 spur wheel
970 control housing
981 housing of the thrust unit
982 second angle drive
983 propeller shaft
984 propeller
b_A width of the teeth
d_a_1 first outside diameter
d_a_2 second outside diameter
d_f_1 first root diameter
d_f_2 second root diameter
S intersection point between main axis and tumble axis
α orbital angle

The invention claimed is:

1. A harmonic drive, comprising a drive element pivoted about a main axis, a transmission element, which has been arranged in such a way that it can be rotated about a tumble axis, whereas the tumble axis intersects the main axis under an orbital angle and rotates together with the drive element about the main axis, as well as an output drive element and a supporting element, whereas a first coupling element has been arranged between the transmission element and the output drive element, and a second coupling element has been arranged between the transmission element and the supporting element, wherein the first coupling element comprises a first gear pairing and the second coupling element comprises a second gear pairing, wherein the first gear pairing comprises a first and a second tooth system, wherein the second gear pairing comprises a third and a fourth tooth system, wherein there is a difference in the number of teeth between the first and the second tooth system and the third and the fourth tooth system, wherein the first and the third tooth system arranged at the transmission element are designed as external tooth systems, and the second tooth system arranged at the output drive element, as well as the fourth tooth system arranged at the supporting element are each designed as an internal tooth system, and wherein at least one of the external tooth systems or at least one of the internal tooth systems is a spur toothing system having a profile displacement changing along a gear width of the spur toothing system.

2. A harmonic drive, comprising a drive element pivoted about a main axis, a transmission element, which has been arranged in such a way that it can be rotated about a tumble axis, whereas the tumble axis intersects the main axis under an orbital angle and rotates together with the drive element about the main axis, as well as an output drive element and a supporting element, whereas a first coupling element has been arranged between the transmission element and the output drive element, and a second coupling element has been arranged between the transmission element and the supporting element, wherein the first coupling element comprises a first gear pairing and the second coupling element comprises a second gear pairing, wherein the first gear pairing comprises a first and a second tooth system, wherein the second gear pairing comprises a third and a fourth tooth system, wherein there is a difference in the number of teeth between the first and the second tooth system and the third and the fourth tooth system, wherein the first and the third tooth system arranged at the transmission element are designed as internal tooth systems, and the second tooth system arranged at the output drive element, as well as the fourth tooth system arranged at the supporting element are each designed as an external tooth system, and wherein at least one of the external tooth systems or at least one of the internal tooth systems is a spur toothing system having a profile displacement changing along a gear width of the spur toothing system.

3. A harmonic drive, comprising a drive element pivoted about a main axis, a transmission element, which has been arranged in such a way that it can be rotated about a tumble axis, whereas the tumble axis intersects the main axis under an orbital angle and rotates together with the drive element about the main axis, as well as an output drive element and a supporting element, whereas a first coupling element has been arranged between the transmission element and the output drive element, and a second coupling element has been arranged between the transmission element and the supporting element, wherein the first coupling element comprises a first gear pairing and the second coupling element comprises a second gear pairing, wherein the first gear pairing comprises a first and a second tooth system, wherein the second gear pairing comprises a third and a fourth tooth system, wherein there is a difference in the number of teeth between the first and the second tooth system and the third and the fourth tooth system, wherein the first tooth system arranged at the transmission element and the fourth tooth system arranged at the supporting element are designed as internal tooth systems, and the second tooth system arranged at the output drive element and the third tooth system arranged at the transmission element are designed as external tooth system, and wherein at least one of the external tooth systems or at least one of the internal tooth systems is a spur toothing system having a profile displacement changing along a gear width of the spur toothing system.

4. A harmonic drive, comprising a drive element pivoted about a main axis, a transmission element, which has been arranged in such a way that it can be rotated about a tumble axis, whereas the tumble axis intersects the main axis under an orbital angle and rotates together with the drive element about the main axis, as well as an output drive element and a supporting element, whereas a first coupling element has been arranged between the transmission element and the output drive element, and a second coupling element has been arranged between the transmission element and the supporting element, wherein the first coupling element comprises a first gear pairing and the second coupling element comprises a second gear pairing, wherein the first gear pairing comprises a first and a second tooth system, wherein the second gear pairing comprises a third and a fourth tooth system, wherein there is a difference in the number of teeth between the first and the second tooth system and the third and the fourth tooth system, wherein the first and the third tooth system arranged at the transmission element are designed as internal tooth systems, and the second tooth system arranged at the output drive element and the fourth tooth system arranged at the supporting element are designed as external tooth systems, whereas the first and the third tooth system have different diameters and have been arranged concentrically at the transmission element, and wherein at least one of the external tooth systems or at least one of the internal tooth systems is a spur toothing system having a profile displacement changing along a gear width of the spur toothing system.

5. A harmonic drive, comprising a drive element pivoted about a main axis, a transmission element, which has been arranged in such a way that it can be rotated about a tumble axis, whereas the tumble axis intersects the main axis under an orbital angle and rotates together with the drive element about the main axis, as well as an output drive element and a supporting element, whereas a first coupling element has been arranged between the transmission element and the output drive element, and a second coupling element has been arranged between the transmission element and the supporting element, and whereas at least one of the two coupling elements comprises a gear pairing, characterized in that the tooth systems of the gear pairings used as a coupling element are designed as spur toothing system, wherein the first coupling element is designed as at least one first gear pairing, consisting of a first and a second tooth system, and the second coupling element is designed as a gimbal, and wherein at least one coupling element consists of two gear pairings, respectively in order to compensate the radial forces resulting from the tooth systems, whereas the tooth engagements of the tooth systems forming the two gear pairings are arranged in such a way that they are offset toward each other by 180°.

6. A harmonic drive according to claim 5,
wherein the harmonic drive is connected between an electric motor and a swivel-mounted thrust unit of the ship propulsion system, and
wherein the electric motor adjusts the direction of thrust of the swivel-mounted thrust unit.

7. A harmonic drive, comprising a drive element pivoted about a main axis, a transmission element, which has been arranged in such a way that it can be rotated about a tumble axis, whereas the tumble axis intersects the main axis under an orbital angle and rotates together with the drive element about the main axis, as well as an output drive element and a supporting element, whereas a first coupling element has been arranged between the transmission element and the output drive element, and a second coupling element has been arranged between the transmission element and the supporting element, and whereas at least one of the two coupling elements comprises a gear pairing, characterized in that the tooth systems of the gear pairings used as a coupling element are designed as spur toothing system,
wherein the first coupling element is designed as at least one first gear pairing, consisting of a first and a second tooth system, and the second coupling element is designed as a gimbal, and
wherein at least one tooth system of a gear pairing is designed as an evolvent a spur toothing system having a profile displacement changing along a gear width of the spur toothing system.

8. A harmonic drive according to claim 7,
wherein the harmonic drive is connected between an electric motor and a swivel-mounted thrust unit of the ship propulsion system, and
wherein the electric motor adjusts the direction of thrust of the swivel-mounted thrust unit.

9. A harmonic drive according to claim 1,
wherein the harmonic drive is connected between an electric motor and a swivel-mounted thrust unit of the ship propulsion system, and
wherein the electric motor adjusts the direction of thrust of the swivel-mounted thrust unit.

10. A harmonic drive according to claim 2,
wherein the harmonic drive is connected between an electric motor and a swivel-mounted thrust unit of the ship propulsion system, and
wherein the electric motor adjusts the direction of thrust of the swivel-mounted thrust unit.

11. A harmonic drive according to claim 3,
wherein the harmonic drive is connected between an electric motor and a swivel-mounted thrust unit of the ship propulsion system, and
wherein the electric motor adjusts the direction of thrust of the swivel-mounted thrust unit.

12. A harmonic drive according to claim 4,
wherein the harmonic drive is connected between an electric motor and a swivel-mounted thrust unit of the ship propulsion system, and
wherein the electric motor adjusts the direction of thrust of the swivel-mounted thrust unit.

* * * * *

UNITED STATES PATENT AND TRADEMARK OFFICE
CERTIFICATE OF CORRECTION

PATENT NO. : 8,500,500 B2 Page 1 of 1
APPLICATION NO. : 12/988484
DATED : August 6, 2013
INVENTOR(S) : Joerg Boerner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 96 days.

Signed and Sealed this

Fifteenth Day of September, 2015

Michelle K. Lee
*Director of the United States Patent and Trademark Office*